US012077956B2

(12) United States Patent
Lee

(10) Patent No.: US 12,077,956 B2
(45) Date of Patent: Sep. 3, 2024

(54) TRASH COLLECTOR FOR DRAINAGE CHANNELS

(71) Applicant: Nak Jun Lee, Gwangju-si (KR)

(72) Inventor: Nak Jun Lee, Gwangju-si (KR)

( * ) Notice: Subject to any disclaimer, the term of this patent is extended or adjusted under 35 U.S.C. 154(b) by 435 days.

(21) Appl. No.: 17/623,245

(22) PCT Filed: Feb. 15, 2021

(86) PCT No.: PCT/KR2021/001862
§ 371 (c)(1),
(2) Date: Dec. 28, 2021

(87) PCT Pub. No.: WO2022/035006
PCT Pub. Date: Feb. 17, 2022

(65) Prior Publication Data
US 2022/0356692 A1    Nov. 10, 2022

(30) Foreign Application Priority Data

Aug. 12, 2020  (KR) ........................ 10-2020-0100937

(51) Int. Cl.
*E03F 5/04*  (2006.01)
*E03F 5/14*  (2006.01)
(52) U.S. Cl.
CPC ............ *E03F 5/041* (2013.01); *E03F 5/0401* (2013.01); *E03F 5/14* (2013.01)
(58) Field of Classification Search
CPC ......... E03F 5/0405; E03F 5/0401; E03F 5/14; E03F 2005/061; E03F 2005/0414; E03F 5/04; E03F 5/0411
USPC .............. 210/163, 170.03; 137/527.8; 404/4; 405/87, 99
See application file for complete search history.

(56) References Cited

FOREIGN PATENT DOCUMENTS

| KR | 20120001289 U | * | 2/2012 |
| KR | 102002788 B1 | * | 7/2019 |
| KR | 200489947 Y1 | * | 8/2019 |

OTHER PUBLICATIONS

KR, 200489947 Y1, English machine translation pp. 1-7 (Year: 2019).*
KR 20120001289 U, English machine translation, pp. 1-7 (Year: 2019).*
KR 102002788 B1, English machine translation, pp. 1-5 (Year: 2019).*

* cited by examiner

*Primary Examiner* — Claire A Norris
(74) *Attorney, Agent, or Firm* — KORUS Patent, LLC; Seong Il Jeong

(57) ABSTRACT

Disclosed is a trash collector for drainage channels. The trash collector includes a main frame provided with engaged parts engaged with engaging protrusions of an inlet of a drainage channel and a penetration part having one side vertically penetrated, an opening and closing plate mounted in the penetration part so as to selectively open and close the penetration part depending on a load of water introduced through the inlet of the drainage channel, and a hinge shaft interposed between the main frame and the opening and closing plate so as to axially rotate the opening and closing plate. A base plate of the main frame and the opening and closing plate have a designated height so that fallen leaves and road trash accumulated and gathered on the base plate and the opening and closing plate may be sufficiently suctioned by suction force of a street cleaning vehicle.

3 Claims, 3 Drawing Sheets

TRASH COLLECTOR FOR DRAINAGE CHANNELS

BACKGROUND OF THE INVENTION

Field of the Invention

The present invention relates to a trash collector for drainage channels, and more particularly, to a trash collector for drainage channels which is installed at the inlet of a drainage channel to be opened so as to guide water, such as rainwater, introduced through a grating to the drainage channel and to be closed so as to gather trash falling from surrounding roads and then to artificially remove the gathered trash without passing through the drainage channel thereunder.

Description of the Related Art

In general, a drain cover (i.e., a trash collector for drainage channels), i.e., one of drainage facilities, which may withstand load applied from the top and smoothly drain rainwater or wastewater while filtering out foreign substances having a comparatively large size, is provided at drainage channels formed at various places, such as roadsides, parks and amusement parks.

Such a conventional drain cover installed at the upper end of a drainage channel has a structure, for example, in which a plurality of flat or I-shaped bearing bars are welded onto both frames in the width direction and a plurality of rod-type or screw-type cross bars intersect the upper ends of the bearing bars, and is configured so as to smoothly drain rainwater or wastewater while filtering out foreign substances having a comparatively large size at the upper end of the drainage channel (as disclosed in Korean Patent Registration No. 10-913210).

However, the above conventional drain cover is formed in an open structure which causes the drainage channel under the drain cover and a peripheral space above the drain cover to communicate with each other, and thus, odor emanating from the lower portion of the drainage channel is emitted upwards to the atmosphere and spreads around the drainage channel.

Further, since the drainage channel and the atmosphere communicate with each other, foreign substances having a comparatively small volume, such as cigarette butts or fallen leaves, enter the drainage channel, and may thus contaminate or clog the drainage channel.

In order to solve these problems, various closed-type drain covers have been suggested. For example, one of these conventional closed-type drain covers is configured to close the upper end of a drainage channel at normal times and to open the upper end of the drain channel in the event of rain so as to achieve smooth drainage, and includes a buoyancy bucket provided under an opening and closing member rotatably hinged to the upper surface of an inclined plane inclined downwards from the upper surface of a frame by a rotating shaft and closed at normal times, a buoyant body elevated and lowered by water introduced into the buoyancy bucket, and a buoyant unit configured to open and close the opening and closing member using the buoyant body.

Therefore, the opening and closing member is closed to shut the upper end of the drainage channel at normal times so as to block odor emanating from the lower portion of the drainage channel and to prevent foreign substances having a small size, such as cigarette butts or fallen leaves, from entering the drainage channel, and is opened by the buoyant unit due to water or rainwater flowing thereinto in the event of rain so as to achieve smooth drainage, thereby being capable of solving the problems of the conventional open-type drain covers (as disclosed in Korean Patent Registration No. 10-1064257).

However, in the above conventional closed-type drain cover, the opening and closing member is formed in the inclined plane structure, and thus, there is a great height difference between a grating at the inlet of the drainage channel and the lower end of the inclined plane, trash on the lower end of the drain cover is not suctioned by suction force of, for example, a street cleaning vehicle, and is left and enters the drainage channel together with rainwater, thus consequently clogging the drainage channel and consequently contaminating a sewage treatment plant.

SUMMARY OF THE INVENTION

Therefore, the present invention has been made in view of the above problems, and it is an object of the present invention to provide a trash collector for drainage channels in which a base plate of a main frame is formed in a flat horizontal plate structure and an opening and closing plate mounted in a penetration part of the base plate is formed in a horizontal plate structure having the same height up to the upper end of an inlet of a drainage channel as the base plate so that fallen leaves and road trash accumulated and gathered on the base plate and the opening and closing plate may be sufficiently suctioned by suction force of a street cleaning vehicle or the like.

It is another object of the present invention to provide a trash collector for drainage channels in which a screw thread is formed on the outer circumferential surface of an opening control stopper and a spiral hole having a screw thread engaged with the screw thread of the opening degree control stopper is formed in a base plate corresponding to the opening degree control stopper so that the opening degree control stopper may be moved up and down and may thus smoothly control the opening degree of an opening and closing plate depending on the inflow rate of water.

It is yet another object of the present invention to provide a trash collector for drainage channels in which bearing plates, each of which has a shaft mounting hole formed in a long hole structure so that the position of a hinge shaft is varied in the length direction of an opening and closing plate, are provided, and a shaft support plate having a plurality of shaft position change holes configured to change the position of the hinge shaft passing through the shaft support plate in the length direction of the opening and closing plate is provided at one side of the lower surface of the opening and closing plate, so as to omit a weight separately installed on the lower surface of the opening and closing plate or to use weights having different masses depending on change in the position of the hinge shaft.

In accordance with the present invention, the above and other objects can be accomplished by the provision of a trash collector for drainage channels including a main frame provided with engaged parts engaged with engaging protrusions of an inlet of a drainage channel and a penetration part having one side vertically penetrated, an opening and closing plate mounted in the penetration part so as to selectively open and close the penetration part depending on a load of water introduced through the inlet of the drainage channel, and a hinge shaft interposed between the main frame and the opening and closing plate so as to axially rotate the opening and closing plate with respect to the main frame.

The main frame of the trash collector for drainage channels may include a base plate provided with the penetration part formed at a center thereof, vertical wall plates configured to stand upright from respective edges of the base plate, and the engaged parts configured to extend outwards from upper ends of the vertical wall plates.

The base plate may be formed in a flat horizontal plate structure, and the opening and closing plate mounted in the penetration part of the base plate may be formed in a horizonal plate structure configured to have the same height up to an upper end of the inlet of the drainage channel as the base plate.

The hinge shaft may be installed at one side of the opening and closing plate in the length direction thereof, and thus, the opposite part of the opening and closing plate far away from the hinge shaft is rotated downwards due to the load of water, such as rainwater, applied to the upper surface of the opening and closing plate, and thereby, may open the penetration part.

The main frame may be provided with an opening degree control stopper configured to prevent the opening and closing plate from being opened any more after the opening and closing plate is opened to a designated opening degree when the penetration part is opened by the opening and closing plate.

Further, the opening degree control stopper may be formed in a straight rod structure having one side connected to the upper surface of one side of the base plate in the width direction thereof corresponding to the axial direction of the hinge shaft, and the other side configured to extend straight to the upper surface of the opening and closing plate and then to be fixed.

Further, according to another embodiment of the present invention, the opening degree control stopper may be formed in a bent rod structure having one side intersecting the axial direction of the hinge shaft and connected to the upper surface of one side of the base plate in the length direction thereof adjacent to the hinge shaft and the other side rectilinearly extending upwards and bent towards the opening and closing plate at a right angle.

Further, a screw thread may be formed on the outer circumferential surface of the opening degree control stopper and a spiral hole having a screw thread engaged with the screw thread of the opening degree control stopper is formed in the base plate corresponding to the opening degree control stopper so that the opening degree control stopper may be moved up and down.

The opening and closing plate may have a weight having a rectangular block shape and configured to return the opening and closing plate to an original state thereof when the side of the opening and closing plate opposite to the hinge shaft is opened downwards and then the load of water is removed.

Here, The weight may be provided at one side of the lower surface of the opening and closing plate adjacent to the hinge shaft.

Further, the opening and closing plate may have a lifting prevention stopper configured to prevent a returning part of the opening and closing plate from lifting upwards over the penetration part when the opening and closing plate returns to the original state thereof due to release of the load of water.

Here, the lifting prevention stopper may be formed in a band plate structure having one side connected to the lower surface of the returning part of the opening and closing plate and the other side configured to extend towards the lower surface of the base plate coplanar with the returning part of the opening and closing plate so as to be caught by the lower surface of the base plate.

Further, bearing plates formed in a long rectangular plate shape and configured to extend downwards from both sides of the base plate in the width direction thereof and to have a circular shaft mounting hole so that the hinge shaft pass through the shaft mounting holes of the respective bearing plates may be provided.

Here, the shaft mounting hole having a long hole structure may be formed in each of bearing plates so that the position of a hinge shaft is varied in the length direction of the opening and closing plate.

Further, a shaft support plate having a plurality of shaft position change holes configured to surround the hinge shaft passing therethrough and continuously arranged in the length direction of the shaft support plate so as to change the position of the hinge shaft in the length direction of the opening and closing plate may be provided at one side of the lower surface of the opening and closing plate.

A plurality of movement slits configured to communicate the respective shaft position change holes with each other may be provided in the shaft support plate, and a moving piece configured to move the hinge shaft from one shaft position change hole to another shaft position change hole adjacent thereto along the corresponding movement slit may be provided at one side of the hinge shaft.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
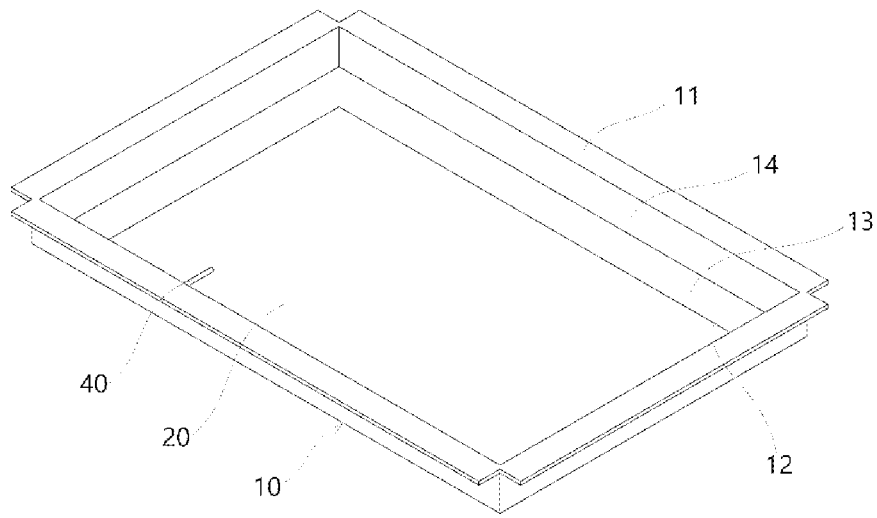
FIG. 1 is a perspective view showing a trash collector for drainage channels according to one embodiment of the present invention.
Figure 2:
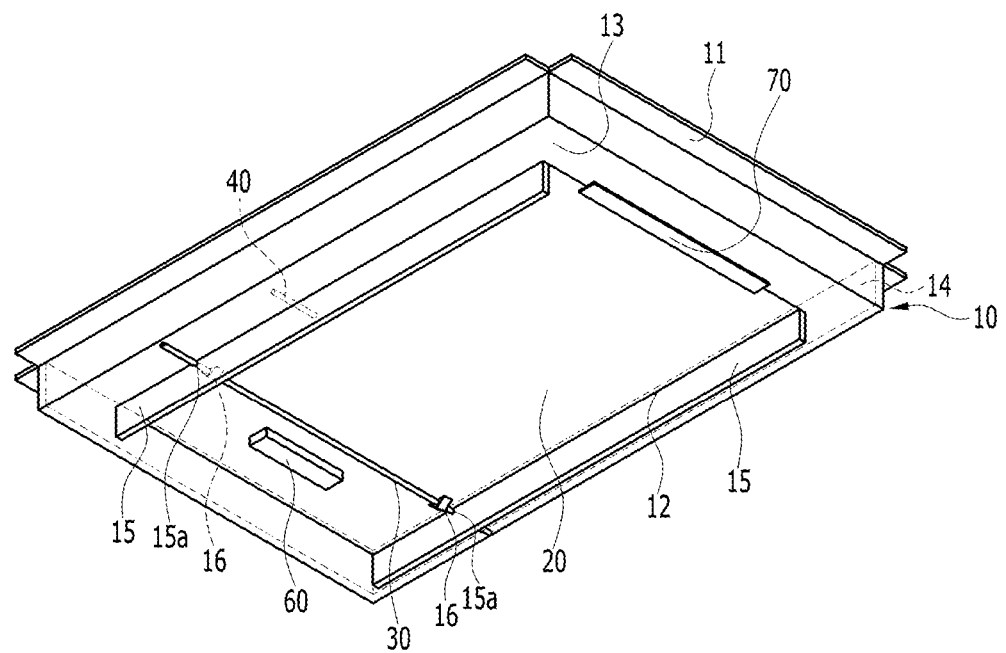
FIG. 2 is a perspective view showing the collector for drainage channels according to one embodiment of the present invention, as seen from the bottom.
Figure 3:
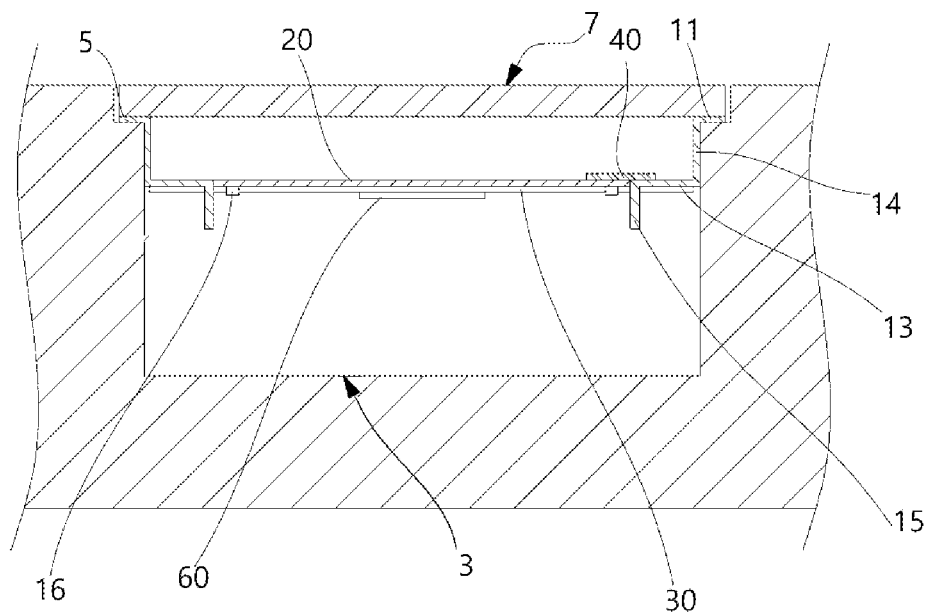
FIG. 3 is a cross-sectional view of the trash collector for drainage channels according to one embodiment of the present invention.

Hereinafter, a trash collector for drainage channels according to one embodiment of the present invention includes a main frame 10, an opening and closing plate 20, and a hinge shaft 30, as shown in FIGS. 1 to 3.

The main frame 10 is formed in a rectangular frame structure having engaged parts 11 engaged with engaging protrusions 5 of an inlet 3 of a drainage channel, and a penetration part 11, one side of which is vertically penetrated.

More concretely, the main frame 10 includes a base plate 13 provided with the penetration part 12 having a rectangular hole shape formed at the center thereof, a plurality of vertical wall plates 14 configured to stand upright from respective edges of the base plate 13, and the engaged parts 11 configured to horizontally extend outwards from the upper ends of the respective vertical wall plates 14.

The opening and closing plate 20 is formed in a rectangular plate structure mounted in the penetration part 12 of the main frame 10 and configured to selectively open and close the penetration part 12 depending on the load of water introduced through the inlet 3 of the drainage channel.

The base plate 13 is formed in a flat horizontal plate structure, and the opening and closing plate 20 mounted in the penetration part 12 of the base plate 13 is formed in a horizontal plate structure having the same height up to the upper end of the inlet 3 of the drainage channel as the base plate 13.

Here, the height from the base plate 13 and the opening and closing plate 20 to the upper end of the inlet 3 of the drainage channel may be a height at which fallen leaves and road trash gathered and accumulated on the base plate 13 and the opening and closing plate 20 are sufficiently suctioned by suction force of, for example, a street cleaning vehicle.

The hinge shaft 30 is formed in a long cylindrical rod structure which is interposed between the main frame 10 and the opening and closing plate 20 and performs a function of rotating the opening and closing plate 20 about the hinge shaft 30 with respect to the main frame 10.

More concretely, the hinge shaft 30 is installed at one side of the opening and closing plate 20 in the length direction thereof, and thus, the opposite part of the opening and closing plate 20 far away from the hinge shaft 30 is rotated downwards due to the load of water, such as rainwater, applied to the upper surface of the opening and closing plate 20, and thereby, may open the penetration part 12.

Further, the main frame 10 is provided with an opening degree control stopper 40 configured to prevent the opening and closing plate 20 from being opened any more after the opening and closing plate 20 is opened to a designated opening degree when the penetration part 12 is opened by the opening and closing plate 20.

Here, the opening degree control stopper 40 is formed in a straight rod structure having one side connected to the upper surface of one side of the base plate 13 in the width direction thereof corresponding to the axial direction of the hinge shaft 30, and the other side configured to extend straight to the upper surface of the opening and closing plate 20 and then to be fixed.

The opening degree control stopper 40 is fixed in place, and thereby, the opening and closing plate 20 may be opened and closed within a predetermined opening degree range.

Figure 4:
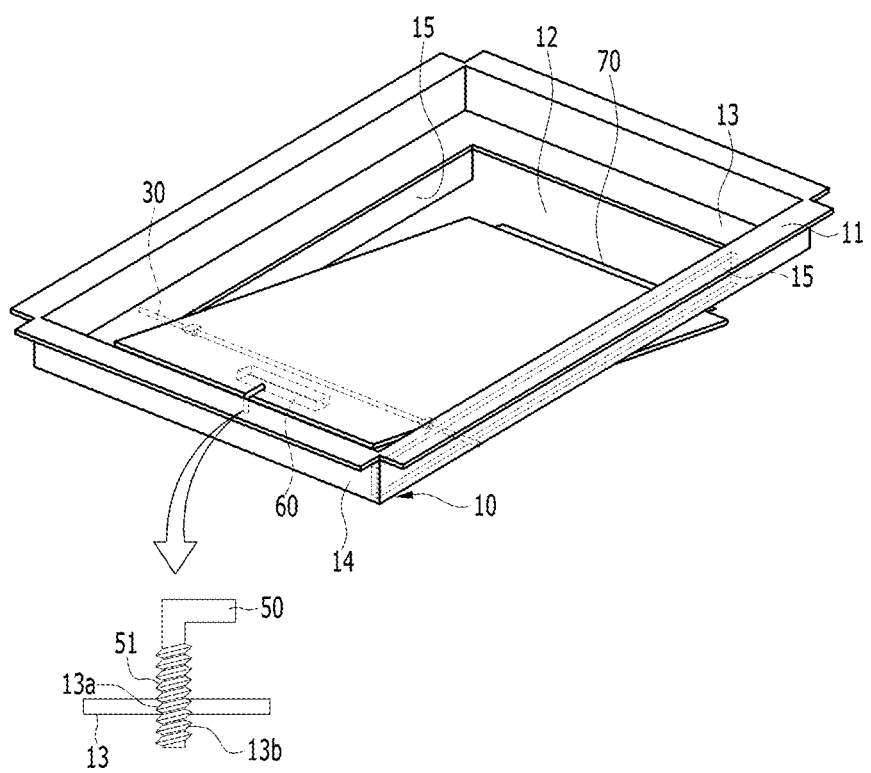
FIG. 4 is a perspective view showing an opening degree control stopper of a trash collector for drainage channels according to another embodiment of the present invention.

Further, according to another embodiment of the present invention, as shown in FIG. 4, an opening degree control stopper 50 may be formed in a bent rod structure having one side intersecting the axial direction of the hinge shaft 30 and connected to the upper surface of one side of the base plate 13 in the length direction thereof adjacent to the hinge shaft 30 and the other side rectilinearly extending upwards and bent towards the opening and closing plate 20 at a right angle.

Further, a screw thread 51 may be formed on the outer circumferential surface of the opening degree control stopper 50 and a spiral hole 13a having a screw thread 13b engaged with the screw thread 51 of the opening degree control stopper 50 is formed in the base plate 13 corresponding to the opening degree control stopper 50 so that the opening degree control stopper 50 may be moved up and down.

The height of the opening degree control stopper 50 may be adjusted, and thus, the opening degree control stopper 50 may smoothly control the opening degree of the opening and closing plate 20 depending on the inflow rate of water.

A weight 60 having a rectangular block shape and configured to return the opening and closing plate 20 to an original state thereof when the side of the opening and closing plate 20 opposite to the hinge shaft 30 is opened downwards and then the load of water is removed is provided on the opening and closing plate 20.

Here, the weight 60 is provided at one side of the lower surface of the opening and closing plate 20 adjacent to the hinge shaft 30.

Further, a lifting prevention stopper 70 configured to prevent a returning part of the opening and closing plate 20 from lifting upwards over the penetration part 12 when the opening and closing plate 20 returns to the original state thereof due to release of the load of water is provided on the opening and closing plate 20.

Here, the lifting prevention stopper 70 is formed in a band plate structure having one side connected to the lower surface of the returning part of the opening and closing plate 20 and the other side configured to extend towards the lower surface of the base plate 13 coplanar with the returning part of the opening and closing plate 20 so as to be caught by the lower surface of the base plate 13.

Further, bearing plates 15 formed in a long rectangular plate shape and configured to extend downwards from both sides of the base plate 13 in the width direction thereof and to have a circular shaft mounting hole 15a so that the hinge shaft 30 pass through the shaft mounting holes 15a of the respective bearing plates 15 are provided.

The bearing plates 15 may support the hinge shaft 30 passing therethrough and serve as guides configured to cause the opening and closing plate 20 to be axially rotated without leaning to one side.

Here, undescribed reference numeral 16 indicates shaft support pieces mounted on the lower surface of the opening and closing plate 20 so as to surround the outer circumferential surface of the hinge shaft 30.

Figure 5:
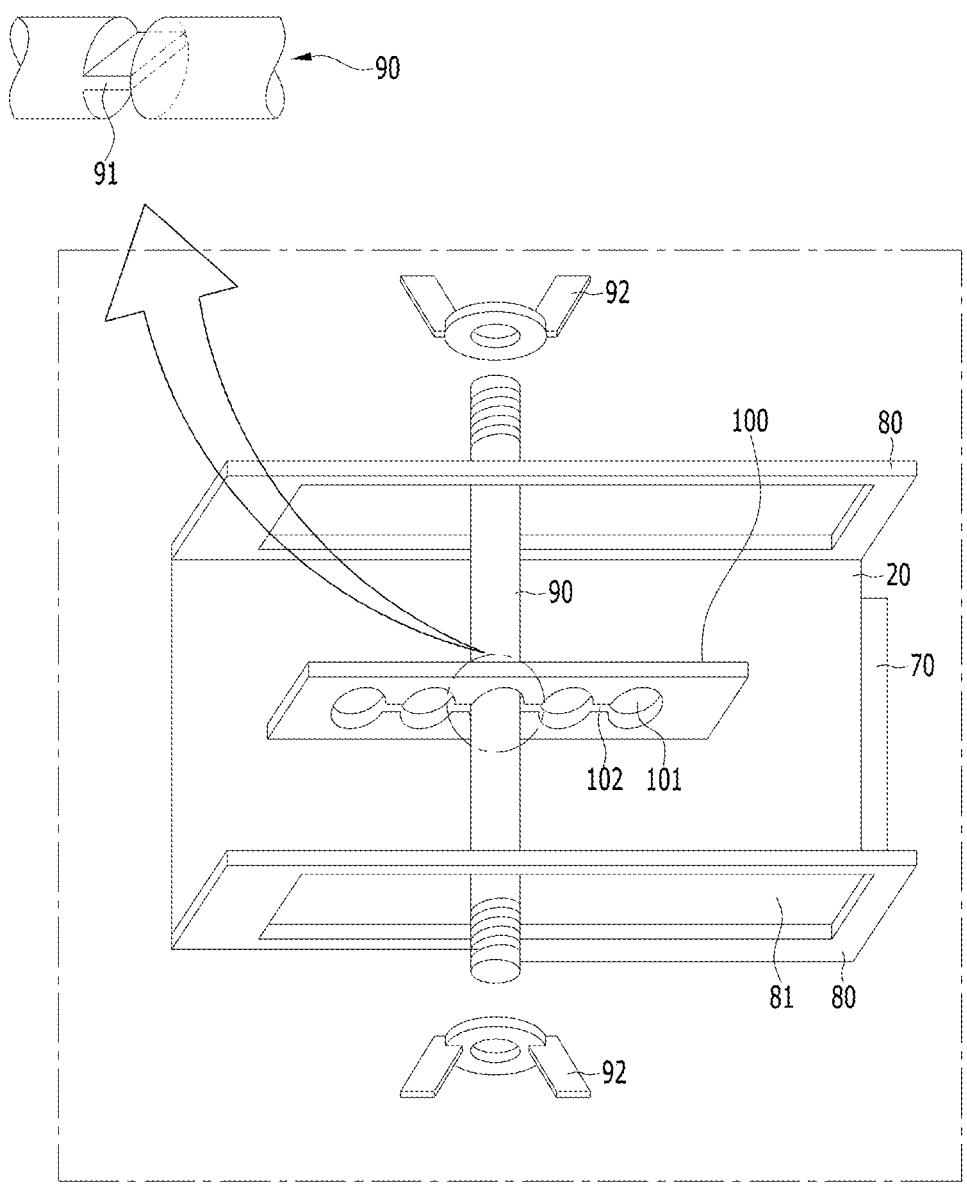
FIG. 5 is a perspective view showing a shaft position change structure of a hinge shaft of a trash collector for drainage channels according to yet another embodiment of the present invention.

According to yet another embodiment of the present invention, as shown in FIG. 5, a shaft mounting hole 81 having a long hole structure may be formed in each of bearing plates 80 so that the position of a hinge shaft 90 is varied in the length direction of the opening and closing plate 20.

Further, a shaft support plate 100 having a plurality of shaft position change holes 101 configured to surround the hinge shaft 90 passing therethrough and continuously arranged in the length direction of the shaft support plate 100 so as to change the position of the hinge shaft 90 in the length direction of the opening and closing plate 20 may be provided at one side of the lower surface of the opening and closing plate 20.

A plurality of movement slits 102 configured to communicate the respective shaft position change holes 101 with each other is provided in the shaft support plate 100, and a moving piece 91 configured to move the hinge shaft 90 from one shaft position change hole 101 to another shaft position change hole 101 adjacent thereto along the corresponding movement slit 102 is provided at one side of the hinge shaft 90.

Thereby, a weight (not shown) separately installed on the lower surface of the opening and closing plate 20 may be omitted, or weights having different masses may be used depending on change in the position of the hinge shaft 90.

Here, undescribed reference numeral 92 indicates butterfly nuts engaged with both ends of the hinge shaft 90 exposed from the outer surfaces of the bearing plates 80 so as to prevent the hinge shaft 90 from being released to the outside of the bearing plates 80.

Usage of the trash collector for drainage channels according to one embodiment of the present invention having the above configuration will be described below.

First, assembly of the trash collector is completed by connecting the opening and closing plate 20 to the penetration part 12 of the main frame 10 through the hinge shaft 30.

Such a trash collector is installed at an inlet 3 of the drainage channel by engaging the engaged parts 11 of the main frame 11 with the engaging protrusions 5 of the inlet 3 of the drainage channel and then placing a grating 7 on the engaged parts 11.

For a designated period of time in this state, trash, such as fallen leaves around a road, falls through the grating 7 and is accumulated and gathered on the base plate 13 of the main frame 10 and the opening and closing plate 20 before entering the drainage channel.

Then, a street cleaning vehicle suctions the trash accumulated and gathered on the base plate 13 and the opening and closing plate 20 through a suction apparatus while passing over the grating 7.

Through this process, the trash on the road is frequently suctioned and collected without entering the drainage channel, and consequently, the various conventional problems (i.e., clogging of a drainage channel, contamination of a sewage treatment plant, etc.) caused by entry of trash into drainage channels may be prevented.

Further, in the event of rain, rainwater enters the base plate 13 and the opening and closing plate 20 through the inlet 3 of the drainage channel and, when a designated amount of rainwater fills a space formed by the base plate 13 and the opening and closing plate 20, the opening and closing plate 20 is rotated downwards about the hinge shaft 30 due to the load of rainwater and thus opens the penetration part 12, and thereby, rainwater flows into the drainage channel under the opened penetration part 12.

Here, the opening and closing plate 20 is opened within a designated opening degree range by the opening degree control stopper 40, thereby enabling rainwater to flow down into the drainage channel.

In the rainy season in which rainfall is abundant, the opening degree control stopper 50 according to another embodiment of the present invention may be applied so as to further increase the opening degree of the opening and closing plate 20.

Thereafter, when the load of rainwater applied to the opening and closing plate 20 is released, the opening and closing plate 20 axially rotated downwards to be opened returns to the original state thereof due to the load of the weight 60.

Here, the lifting prevention stopper 70 provided at the side of the opening and closing plate 20 opposite to the hinge shaft 30 may be caught by the lower surface of the base plate 13, thereby being capable of preventing the opening and closing plate 20 from being lifted upwards.

Further, when the bearing plates 80, the hinge shaft 90 and the shaft support plate 100 according to yet another embodiment of the present invention are applied, the opening and closing plate 20 may keep balance just by changing the position of the hinge shaft 90 through the shaft position change holes 101 without installation of the weight 60 on the lower surface of the opening and closing plate 20, thereby being capable of performing a smooth opening and closing function.

As apparent from the above description, the present invention provides a trash collector for drain channels in which a base plate of a main frame is formed in a flat horizontal plate structure and an opening and closing plate mounted in a penetration part of the base plate is formed in a horizontal plate structure having the same height up to the upper end of an inlet of a drainage channel as the base plate so that fallen leaves and road trash accumulated and gathered on the base plate and the opening and closing plate may be sufficiently suctioned by suction force of a street cleaning vehicle, thereby being capable of preventing remaining trash without being suctioned, together with rainwater, from entering the drainage channel and consequently contaminating a sewage treatment plant, and thus reducing working expenses due to omission of contaminant removal work in the sewage treatment plant and preventing safety accidents of workers working in the sewage treatment plant.

Further, a screw thread is formed on the outer circumferential surface of an opening degree control stopper and a spiral hole having a screw thread engaged with the screw thread of the opening degree control stopper is formed in the base plate corresponding to the opening degree control stopper, so that the opening degree control stopper may be moved up and down and may thus smoothly control the opening degree of the opening and closing plate depending on the inflow rate of water, thereby being capable of easily guiding rainwater to the drainage channel through an appropriate response in the event of sudden inflow of rainwater in the rainy season or the like, preventing road flooding or contamination due to backward flowing of rainwater and thus improving product reliability.

In addition, bearing plates, each of which has a shaft mounting hole formed in a long hole structure so that the position of a hinge shaft is varied in the length direction of the opening and closing plate, are provided, and a shaft support plate having a plurality of shaft position change holes configured to change the position of the hinge shaft passing through the shaft support plate in the length direction of the opening and closing plate is provided at one side of the lower surface of the opening and closing plate, so as to omit a weight separately installed on the lower surface of the opening and closing plate or to use weights having different masses depending on change in the position of the hinge shaft, thereby reducing costs due to omission of the weight, improving compatibility of the opening and closing plate due to selective use of the weights having different masses, and consequently improving product competitiveness.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A trash collector for drainage channels comprising:
    a main frame provided with engaged parts engaged with engaging protrusions of an inlet of a drainage channel and a penetration part having one side vertically penetrated;
    an opening and closing plate mounted in the penetration part so as to selectively open and close the penetration part depending on a load of water introduced through the inlet of the drainage channel; and a hinge shaft interposed between the main frame and the opening and closing plate so as to axially rotate the opening and closing plate with respect to the main frame, wherein the main frame comprises:

a base plate provided with the penetration part formed at a center thereof;

vertical wall plates configured to stand upright from respective edges of the base plate; and the engaged parts configured to extend outwards from upper ends of the vertical wall plates, wherein:

the main frame is provided with an opening degree control stopper configured to prevent the opening and closing plate from being opened any more after the opening and closing plate is opened to a designated opening degree when the penetration part is opened by the opening and closing plate;

the opening degree control stopper is formed in a bent rod structure having one side configured to intersect an axial direction of the hinge shaft and connected to an upper surface of one side of the base plate in a length direction thereof adjacent to the hinge shaft and a remaining side configured to rectilinearly extend upwards and then to be bent towards the opening and closing plate;

a screw thread is formed on an outer circumferential surface of the opening degree control stopper, and a spiral hole having a screw thread engaged with the screw thread of the opening degree control stopper is formed in the base plate corresponding to the opening degree control stopper so that the opening degree control stopper may be moved up and down;

the base plate is provided with bearing plates formed in a long rectangular plate shape and configured to extend downwards from both sides of the base plate in a width direction thereof and to have a shaft mounting hole so that the hinge shaft passes through the shaft mounting holes of the respective bearing plates;

the shaft mounting holes of the bearing plates are formed in a long hole structure so that a position of the hinge shaft is varied in a length direction of the opening and closing plate;

a shaft support plate having a plurality of shaft position change holes configured to surround the hinge shaft passing therethrough and continuously arranged in a length direction of the shaft support plate so as to change the position of the hinge shaft in the length direction of the opening and closing plate is provided at one side of a lower surface of the opening and closing plate; and a plurality of movement slits configured to communicate the respective shaft position change holes with each other is provided in the shaft support plate, and a moving piece configured to move the hinge shaft from one shaft position change hole to another shaft position change hole adjacent thereto along a corresponding one of the movement slits is provided at one side of the hinge shaft.

2. The trash collector for drainage channels according to claim 1, wherein:

the base plate is formed in a flat horizontal plate structure; and the opening and closing plate mounted in the penetration part of the base plate is formed in a horizonal plate structure configured to have the same height up to an upper end of the inlet of the drainage channel as the base plate.

3. The trash collector for drainage channels according to claim 1, wherein a lifting prevention stopper configured to prevent a returning part of the opening and closing plate from lifting upwards over the penetration part when the opening and closing plate returns to an original state thereof due to release of the load of water is further provided on the opening and closing plate.

* * * * *